United States Patent [19]

Goel

[11] Patent Number: 4,683,281

[45] Date of Patent: Jul. 28, 1987

[54] ORGANOPHOSPHITE ACCELERATORS FOR EPOXIDE CURING

[75] Inventor: Anil B. Goel, Worthington, Ohio

[73] Assignee: Ashland Oil, Inc., Ashland, Ky.

[21] Appl. No.: 877,058

[22] Filed: Jun. 23, 1986

[51] Int. Cl.$^4$ .................. C08G 59/50; C08G 59/68
[52] U.S. Cl. ............................. 528/89; 528/108; 528/407; 528/111
[58] Field of Search ............. 528/89, 111, 108, 407

[56] References Cited

U.S. PATENT DOCUMENTS

| | | | |
|---|---|---|---|
| 3,637,591 | 1/1972 | Coran | 528/89 |
| 3,703,496 | 11/1972 | Modan et al. | 528/89 X |
| 4,294,886 | 10/1981 | Uram | 528/89 X |
| 4,365,052 | 12/1982 | Reeh et al. | 528/89 X |

Primary Examiner—Earl Nielsen
Attorney, Agent, or Firm—John F. Jones

[57] ABSTRACT

A curable epoxide composition comprising an epoxide resin, a triaryl phosphite accelerator and a poly(alkylene oxide) polyamine or an amino alkyl piperazine hardener is disclosed.

10 Claims, No Drawings

ORGANOPHOSPHITE ACCELERATORS FOR EPOXIDE CURING

This invention relates to a process for the acceleration of the curing reaction between epoxy resins and curing agents therefor by carrying out the reaction in the presence of an organophosphite accelerator.

A large number of epoxy resin curing agents are disclosed in the literature (Lee, M. and Neville, K., *Handbook of Epoxy Resins*). The most commonly used curing agents are primary and secondary amino groups containing reagents which may also contain tertiary amino groups. Most of such amine curing agents described in the prior art cure epoxy resins at low temperatures as well as at moderately elevated temperatures. The amine curing agents which cure epoxy at a rapid rate are generally short chain amines, and due to their rapid reactivities, the pot life of the mixtures is low. Also, the polymer products formed in these reactions are generally stiff and brittle. In various applications, it is desired to have a long RT pot life (open time) and the polymer with high flexibility and toughness. There is extensive patent literature on the curing of epoxy resins with long chain poly(propylene oxide)di- and triprimary amines (U.S. Pat. No. 4,485,229 and references cited therein). These polyamines have been reported to be unique in the sense that (1) they cure epoxy resins at a very slow rate, both at ambient temperatures as well as moderately elevated temperatures, thus providing long pot life (open time); (2) the polymers obtained exhibit excellent flexibility; and (3) the epoxy cured polymers show good adhesion properties. However, because of their low reactivity towards epoxy resins, use of accelerators are generally needed with the poly(propylene oxide)polyamines. A number of accelerators are reported in the prior art for accelerating the epoxy/amine curing. Almost all the prior art described accelerators which include inorganic and organic metal salts such as lithium chloride and stannous octoate, tertiary amines, phenolics, etc., do provide some cure acceleration with commonly used primary and secondary amines including long chain poly(propylene oxide)polyamines; however, they themselves also react with the epoxy resins or promote the homopolymerization of epoxy resins. In addition to this, some of the aforementioned prior art accelerators also catalyze the epoxy polymerization with hydroxyl groups. Certain dithiocarbamate salts of the polyoxyalkylene polyamine have been reported as curing accelerators for the poly(propylene oxide)polyamine curing agents (U.S. Pat. No. 4,110,313). These cure accelerators, which contain reactive —SH groups, also react themselves with the epoxy resins. A variety of other accelerators are described in the following U.S. Patents: U.S. Pat. Nos. 2,681,901; 2,839,480; 3,875,072 and 4,195,153. As described above, these accelerators cure epoxy resins, thus resulting in lowering of the pot life (open time). Furthermore, use of certain amines (short chain amines containing tertiary amine group such as aminoethylpiperazine) helps to improve the curing rate of the epoxy resins with long chain poly(alkylene oxide)polyamines but use of them at higher levels generally affect the flexibility of the polymers. There is a need for curable epoxy resin compositions which cure very rapidly at moderately elevated temperatures with long chain poly(alkylene oxide)polyamines and have long ambient temperature pot life (open time), and the cured polymers should have high flexibility and good adhesion properties.

I have discovered that epoxide resins when mixed with a curing agent such as an amine and small amounts of a triarylphosphite such as triphenyl phosphite have excellent shelf life and cure at a rapid rate at moderately elevated temperatures.

Most of the prior art accelerators are known to cure epoxy resins by themselves and therefore they usually are mixed with the curing agent and are used in two component systems comprising an epoxy component and a curing agent (hardener) component which contains the accelerator. I have discovered that the triarylphosphites act as accelerators but do not catalyze the polymerization of epoxide resins in the absence of a curing agent. Thus, solutions of epoxy resins containing small amounts of triarylphosphites which have long shelf life undergo rapid curing when mixed with curing agents such as an amine, and the like. The use of prior art accelerators usually results in the reduction of shelf life of the epoxy resin component if the accelerator is mixed into the epoxy resin, or shorter pot life (open time) of the mixture of epoxy resin and hardener at room temperature or requires much higher elevated temperature before the desired acceleration effect takes place in the curing of the resin.

Accordingly, I have discovered that certain triarylphosphites function as excellent accelerators for long chain poly(alkylene oxide)polyamines. These accelerators are practically inert towards epoxy resins at ambient to moderately elevated temperatures, however, they provide rapid cure acceleration for poly(alkylene oxide)polyamines in the temperature range of from 25° C. to 200° C. Furthermore, the polymeric compositions obtained show excellent flexibility.

U.S. Pat. No. 3,637,591 discloses the use of a neutral ester of a phosphorus acid (phosphite ester) as a viscosity reducer. A variety of aliphatic and aromatic phosphite esters have been disclosed for such applications and have shown that when such phosphite esters are used, the physical properties such as shore hardness, etc. of the final polymers remain unaffected. No specific distinction between the aliphatic and aromatic phosphite has been made and the use of aromatic phosphites as accelerators for the slow reacting long chain poly(alkylene oxide)polyamine has not been claimed.

In accordance with this invention, it has been found that aromatic phosphite exhibits excellent cure acceleration when mixed with poly(alkylene oxide)polyamines and aliphatic phosphite shows only a weak acceleration (if any) effect. This is not obvious from the U.S. Pat. No. 3,637,591 that aromatic phosphites would behave as accelerators for long chain polyamines. Furthermore, as will be shown later on in examples of this invention, these aromatic phosphites are unique accelerators in the sense that they do not promote the curing of epoxy with hydroxyl groups to any significant extent at low temperatures, as well as moderately elevated temperatures.

It is further intended to disclose here that the acceleration effect of aromatic phosphite on the curing of epoxy resins with medium and high molecular weight (200–10,000) poly(alkylene oxide)polyamines is best observed when these amines also contain small amounts of short chain alkylene amines such as aminoethylpiperazine, ethylene diamine, bis(aminopropyl)piperazine and the like, and optionally may also contain phenolics such as Bisphenol-A.

There is a need to develop curable epoxy resin compositions which cure rapidly at moderately elevated temperatures without the significant sacrifice of the long shelf life and open time one usually desires.

I have discovered that triarylphosphites such as triphenyl phosphite function as accelerators for the epoxy resin curing along with curing agents such as amines (primary, secondary and tertiary amines), amido-amines, phenolics and the like. The amines used as curing agents include medium and high molecular weight poly(alkylene oxide)di- or tri-primary amines (molecular weight 200 to 10,000), amido-amines obtained by the amidation reaction of carboxylic acid terminated compounds with low molecular weight (less than 200) alkylene polyamines such as ethylene diamine, aminoethyl piperazine, etc., low molecular weight aliphatic and aromatic amines and amine accelerators (optionally) boron trifluoride amine complexes, phenols, substituted phenols, polyphenols, such as Bis-phenol-A and the like.

The triarylphosphites useful as curing accelerators in this invention include those having the formula (RO)$_3$P wherein R represents an aryl group or substituted aryl group having from 6 to 18 carbon atoms.

The epoxy resins or polyepoxides useful in this invention can be monomeric of polymeric, saturated or unsaturated, aliphatic, cycloaliphatic, aromatic or heterocyclic, and they may be substituted if desired with other substitutents besides the epoxy groups, e.g. hydroxyl groups, ether radicals, halogen atoms, and the like. Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 1, that is to say, compounds containing more than one group of the formula

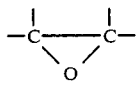

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene carboxylic acid esters, such as methyl 9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters, mono-, di- or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The triarylphosphite accelerators embodied in this invention show no appreciable reactivity with epoxide resins and thus they can be mixed with the epoxide component without the loss of shelf life and they can also help reduce the viscosities of epoxy resin components because the triarylphosphites themselves are usually low viscosity liquids. The triarylphosphite accelerators of this invention may be used in the range of from about 0.2 to 15% by weight and preferably from about 1 to 10% by weight based on the weight of the epoxy resin.

A variety of curing agents or hardeners may be used in the present invention. Amine hardeners containing primary, secondary and tertiary amine groups, amido-amines, phenolics, and the like may be used as stated above. The use of long chain poly(propylene oxide)amines (di- and tri-primary amines) as curing agents to obtain a cured epoxy compositions having good flexibility is a preferred part of this invention. The use of fillers, pigments, etc. in the epoxy resin mixtures of this invention is also within the scope of the present invention.

The compositions produced in this invention may be used in many applications such as for coatings, adhesives for metals, sheet molding compounds (SMC), reinforced plastics, cements and the like and in the preparation of reinforced composite products such as laminated products, in filament windings, molding powders, potting compounds, and the like.

This invention is further illustrated in the following representative examples.

EXAMPLE 1

To 100 g of liquid diglycidyl ether of Bisphenol-A (epoxy equivalent weight of 180–190), having a viscosity of 9200 cps at 72° F. was added 10 g of triphenyl phosphite. The resulting clear solution was kept at room temperature for three weeks and the viscosity of the solution was found to be initially 4400 cps and at the end of the three weeks 4500 cps showing no appreciable change and thus indicating the stability of the epoxy resin in the presence of triphenyl phosphite.

EXAMPLE 2

Ten grams of the epoxy resin-triphenyl phosphite mixture described in Example 1 was placed in an aluminum cup and heated on a hot plate at about 105° C. for 15 minutes. No gelation occurred indicating either no or poor reactivity of triphenyl phosphite towards epoxide resin in the absence of a curing agent.

EXAMPLES 3-4

Several experiments were carried out using the liquid diglycidyl ether of Bisphenol-A described in Example 1 with various amounts of triarylphosphites and amine curing agents (hardener) at temperatures ranging from 100° to 110° C. The gel times were compared with the control experiments having no organophosphite cure accelerators. The results are given in the following Table wherein Examples 3, 6, 8, 10, 12 and 14 are for comparative purposes and are outside the scope of this invention.

TABLE

| Example No. | Epoxy Resin (g) | Triaryl-phosphite (g) | Hardener (g) | RT Open Time (Hrs) | Cure Temp. (°C.) | Gel Time (Min) |
| --- | --- | --- | --- | --- | --- | --- |
| 3 | 4 | — | D400 (2) AEP (0.4) | >5 | 105 | 7 |
| 4 | 4 | (PhO)$_3$P (0.4) | D400 (2) AEP (0.4) | >5 | 105 | 1.5 |
| 5 | 4 | (PhO)$_3$P (0.15) | D400 (2) AEP (0.4) | >5 | 105 | 2 |
| 6 | 5 | — | D400 (2.5) AEP (0.2) | >6 | 105 | 20 |
| 7 | 5 | (PhO)$_3$P (0.15) | D400 (2.5) AEP (0.2) | >6 | 105 | 7 |
| 8 | 10 | — | AEP (1.5) | >2 | 100 | 3.5 |
| 9 | 10 | (PhO)$_3$P (1) | AEP (1.5) | >2 | 100 | 2 |
| 10 | 6 | — | T3000 (4.5) BPA (1.5) | >8 | 100 | 14 |
| 11 | 6 | (PhO)$_3$P (0.5) | T3000 (4.5) BPA (1.5) | >8 | 100 | 9 |
| 12 | 7.5 | — | T3000 (3.2) AEP (0.8) BPA (1.1) | >2 | 110 | 2 |
| 13 | 7.5 | (PhO)$_3$P (0.7) | T3000 (3.2) AEP (0.8) BPA (1.1) | >2 | 110 | 1.45 |
| 14 | 10 | — | D400 (5) AEP (1) | >4 | 105 | 5.5 |

D400 = 400 molecular weight poly(propylene oxide) diprimary amine  AEP = aminoethylpiperazine
T3000 = 3000 molecular weight poly(propylene oxide) tri-primary amine
BPA = Bisphenol-A
Ph = C$_6$H$_5$
RT = *room temperature*
Ph = *Phenyl* (C$_6$H$_5$)

I claim:

1. A curable epoxide composition comprising an epoxide resin, a triaryl phosphite accelerator and a poly(alkylene oxide)polyamine or an amino alkyl piperazine epoxide resin hardener.

2. The composition of claim 1 wherein the triaryl phosphite has the formula (RO)$_3$P wherein R represents an aryl group or alkyl substituted aryl group having from 6 to 18 carbon atoms.

3. The composition of claim 2 wherein the epoxide resin is one containing more than one group of the formula

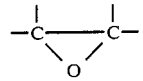

4. The composition of claim 3 wherein the hardener is a poly(propylene oxide)polyamine, aminoethyl piperazine or mixtures thereof.

5. The composition of claim 4 wherein the epoxide resin is a liquid diglycidyl ether of Bis-phenol-A.

6. The composition of claim 5 wherein the triaryl phosphite is triphenyl phosphite.

7. The composition of claim 6 wherein the hardener is a mixture of poly(propylene oxide)diprimary amine and aminoethyl piperazine.

8. The composition of claim 6 wherein the hardener is aminoethyl piperazine.

9. The composition of claim 6 wherein the hardener is a mixture of poly(propylene oxide)triprimary amine and aminoethyl piperazine.

10. The process comprising curing the composition of claim 1 by heating it at a temperature in the range of from about 25° C. to 200° C.

* * * * *